MATRIX-CONTROLLED PHASE-PULSE GENERATOR

Filed Jan. 8, 1957 2 Sheets-Sheet 1

INVENTOR.
DEAN F. BABCOCK
BY Moody and Goldman
ATTORNEYS

Jan. 20, 1959 D. F. BABCOCK 2,870,431

MATRIX-CONTROLLED PHASE-PULSE GENERATOR

Filed Jan. 8, 1957 2 Sheets-Sheet 2

INVENTOR.
DEAN F. BABCOCK
BY Moody and Goldman
ATTORNEYS

United States Patent Office 2,870,431

Patented Jan. 20, 1959

2,870,431

MATRIX-CONTROLLED PHASE-PULSE GENERATOR

Dean F. Babcock, Tarzana, Calif., assignor to Collins Radio Company, Cedar Rapids, Iowa, a corporation of Iowa Application January 8, 1957, Serial No. 633,143

8 Claims. (Cl. 340—170)

This invention relates generally to means for transmitting binary information by phase-modulated pulses. They, for example, may be used to transmit a teletypewriter signal or sampled bits of a continuously varying signal.

This invention utilizes a system of transmission taught in Patent No. 2,676,245 to Melvin L. Doelz, titled "Polar Communication System," and issued April 20, 1954. Briefly, the system utilizes a predetermined phase change between adjacent tone pulses to recognize a mark or space of a binary code. Thus, the system detects a mark or space by a phase comparison of two adjacent pulses, wherein each pulse acts as a phase reference for its immediately following pulse. Therefore, the system does not require any absolute phase reference and, hence, is not appreciably susceptible to unpredictable phase shifts caused by unknown delays in the propagation of a radio signal.

Furthermore, such system is particularly adaptable for the transmission of two independent channels on a single carrier frequency. This is done by providing one of four phase conditions for each new tone pulse with respect to the prior tone pulse; wherein optimum conditions require the signal components of one channel to be in quadrature phase with the signal components of the other channel.

A different means for transmitting information according to this communication system is described and claimed in patent application, Serial No. 502,045 of Melvin L. Doelz and Dean F. Babcock, titled "High Speed Transmission of Printed Messages," filed April 18, 1955. It recirculates a tone between magnetostrictive integrators with two data-signal controlled phase shifters connected respectively between them. The phase-modulated output is taken from gates connected to the respective resonators.

The present invention provides a uniquely different means for generating tone pulses that are adjacently phase modulated.

It is an object of this invention to provide means for translating a pair of amplitude-switched data inputs into incremental phase variation of a tone signal.

It is another object of this invention to provide a phase-pulse tone generator which allows a minimum transient condition between adjacent output pulses.

It is a further object of this invention to provide a phase-pulse tone generator that requires only a single-timing input that is common to the data source.

It is another object of this invention to provide a phase-pulse tone generator that does not require magnetostrictive components.

The invention uses a prime-frequency source, which may be audio-frequency and has a high order of stability. Plural phase-shift means are connected to the prime-frequency source and have tap points that provide the respective phases required by the modulation system. A plurality of output gates have their signal inputs connected respectively to the tap points and have their outputs connected in common to provide the phase-pulsed output of the invention.

Further, the invention uses a plurality of decision gates, each being a circuit conventionally known as an "and" circuit. The decision gates are arranged in a plurality of groups, wherein the number of decision gates in each group equals the number of output gates. The outputs of the decision gates in each group are connected respectively to the control inputs of the output gates.

A plurality of shift-register circuits, equal in number to the output gates, have their signal inputs also connected respectively to the control inputs of the output gates. The resetting input of the shift-register circuits is connected in common to a source of timing pulses that are synchronized with the initiation of the data pulses of both channels. The output of each shift-register circuit is connected to one input of one decision gate in each of the groups.

An intelligence matrix is also required in the dual-channel system to provide the remaining inputs to the decision gates. Four "and" gates are utilized in the intelligence matrix to resolve dual-channel data. Each of their outputs is respectively connected to the remaining inputs of the decision gates of one group. The inputs of the four intelligence gates are permutably connected to four data-input terminals. One pair of terminals receives inverted data from one channel; and the other pair of terminals receives inverted data from the other channel.

Further objects, features and advantages of this invention will be apparent to a person skilled in the art upon further study of the specification and drawings, in which.

Figure 1:
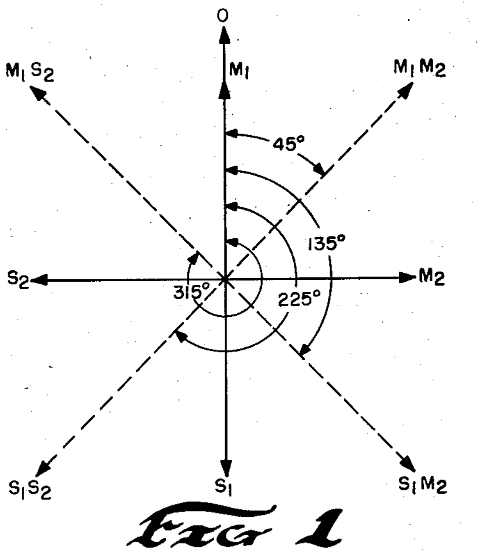
Figure 1 illustrates the phase relationships in an optimum dual-channel system.
Figure 2:
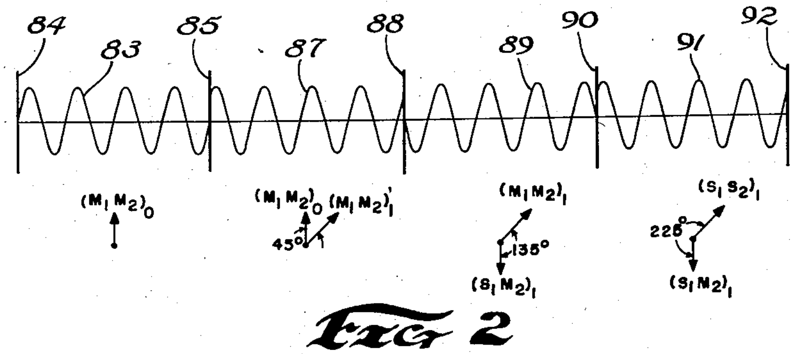
Figure 2 represents phase-pulses and their vector relationships in a dual-channel system.

A sequence of phase-pulses having the same frequency can accommodate two independent channels of binary information without mutual interference. Figure 2 illustrates a sequence of such pulses. The relative phase between adjacent pulses provides simultaneously two bits of information which includes one bit for each of the two channels. Figure 1 illustrates the optimum phase relationships between adjacent tone pulses carrying dual-channel data. In Figure 1, vector O is arbitrarily designated as the phase of the adjacent preceding tone pulse. The phase of its following tone pulse is either $M_1M_2$, $S_1M_2$, $S_1S_2$ or $M_1S_2$ and is an odd integer multiple of 45°. The phase of each of these pulses is split into two components upon detection, with one phase component either in-phase or 180° out-of-phase with the preceding reference pulse to represent the binary information of the first channel, and with the second phase component either plus-or-minus 90° with the preceding pulse to represent the binary information of the second channel. Vectors $M_1$ and $S_1$ represent the phase components of the first channel, with M being a data mark and S a data space. Similarly, vectors $M_2$ and $S_2$ represent the phase components of the second channel. Thus, the four combination vectors $M_1M_2$, $S_1M_2$, $S_1S_2$ and $M_1S_2$ represent the gamut of optimum dual-channel phase conditions between adjacent tone pulses provided by this invention. Each of the dual-channel signals can be separately detected as explained in patent application, Serial No. 502,045.

Thus, any "given" pulse has a phase with respect to its "adjacent preceding" pulse of either 45°, 135°, 225° or 315°. However, it must be remembered throughout this specification that this "given" pulse provides a phase reference for its "next" pulse. Hence, the "next" pulse will be either 45°, 135°, 225° or 315° from the "given" pulse. But the "next" pulse has a phase with respect to the "adjacent preceding" pulse (the second pulse before the "next" pulse) that is 0°, 90°, 180° or 270° (even integer multiples of 45°), because the absolute phase has changed by the sum total of the preceding phase shifts. Phases that are integer multiples of 360° are neglected.

Thus, with respect to an over-all phase-reference frequency, the four phase vectors $M_1M_2$, $S_1M_2$, $S_1S_2$, $M_1S_2$ for a sequence of pulses can be obtained by a system capable of selecting any phase from the group 0°, 45°, 90°, 135°, 180°, 225°, 270° and 315° with respect to a local phase-reference frequency in a pulse-phase generating system.

The over-all phase reference in the invention is provided by a standard-frequency source 10. The standard frequency is usually in the audio range and need only have a stability that does not vary by more than a few degrees over the short interval of a pair of data pulses, which generally is of the order of milliseconds.

The gamut of possible output phases with respect to the standard frequency is provided by a plurality of 45° phase-shift circuits 11 connected in tandem to the output of source 10.

A plurality of eight output gates 12 have their inputs respectively connected to tap points 13, which are connections to 45° phase shift-circuits 11. A control input 14 of each output gate 12 is operated by automatic-computing circuitry included in this invention. The computing circuit operates in a binary manner and uses the two voltage states *a* and *b*. Normally, control inputs 14 receive level *a*, which maintains gates 12 closed to prevent their inputs from passing to their output. Only one output gate 12 receives level *b* at one time to open it and to permit its input frequency to pass through it. An output terminal 16 is connected in common to the output of each output gate 12.

As explained above, each output tone pulse is phase-wise an odd-integer multiple of 45° from its adjacent-preceding tone pulse, but is an even-integer multiple of 45° from its second adjacent-preceding pulse. This sequence repeats for every two consecutive output tone pulses. Thus, with respect to the standard frequency, the phases in any sequence of output tone pulses are alternately selected from a group that is an odd-integer multiple of 45°, and then from a group that is an even-integer multiple of 45°.

Dual-channel data is received by the invention at two pair of input terminals. Terminals 21 and 22 receive channel-one data; and terminals 23 and 24 receive channel-two data. The binary data of each channel is presented by switching between a pair of voltage levels which may be levels *a* and *b*, either of which may be positive or negative direct-voltage levels. The two terminals of each channel receive inverted binary data. For example, when the input at channel-one terminal 21 is at voltage level *b*, the simultaneous input at opposite channel-one terminal 22 is at level *a*, and vice versa.

Either of the two levels *a* or *b* may be made a data-mark and the other a data-space. However, in this specification, a data-mark is assumed to be provided by channel one when level *b* occurs at terminal 21 and when level *a* occurs at opposite terminal 22. Similarly, for channel two, a data-mark is assumed to be provided by level *b* at terminal 23 and level *a* at terminal 24.

The data pulses of the two channels are synchronized with timing pulses provided at terminal 26. A timing pulse occurs upon the initiation of a data pulse in each channel. Since channels one and two can provide independent data, the occurrence of marks and spaces in the respective channels have no necessary correlation.

The invention includes two component computer circuits. One is a decision matrix, and the other is an intelligence matrix.

The intelligence matrix is comprised of four "and" circuits 31, 32, 33 and 34. They have their inputs permutably connected to the data-input terminals. Thus, gates 31 and 34 each have one input connected to channel-one terminal 21; and gates 32 and 33 each have an input connected to the other channel-one terminal 22. Furthermore, the remaining inputs of gates 31 and 32 are connected to channel-two terminal 23; and the other inputs to gates 33 and 34 are connected to opposite channel-two terminal 24.

Each of the "and" gates in this specification is assumed to operate according to the voltage input-output relationships given in the following chart:

CHART I

*"And" circuit*

| Input 1 | Input 2 | Output |
|---|---|---|
| a | a | a |
| a | b | a |
| b | a | a |
| b | b | b |

Thus, the only time that any "and" gate provides output level *b* is when it receives level *b* at both inputs. With all other input combinations, the "and" gate provides output level *a*.

Only one of the intelligence gates 31, 32, 33 and 34 can provide output level *b* with any one combination of data inputs. Thus, gate 31 provides output level *b* when a mark is being provided by both channels (that is $M_1M_2$). In regard to the designation of input data, the sub-number to M (mark) or S (space) identifies the appropriate channel. Likewise, intelligence gates 32, 33 and 34 provide level *b* outputs only when their data inputs are $S_1M_2$, $S_1S_2$ and $M_1S_2$, respectively. Accordingly, the intelligence matrix resolves which of the combination vectors in Figure 1 is required.

The information provided by the intelligence matrix is utilized by the decision matrix, which decides from intelligence-matrix information which one of the eight output gates 12 should be opened to provide the proper phase for a given output tone pulse.

Figure 4:
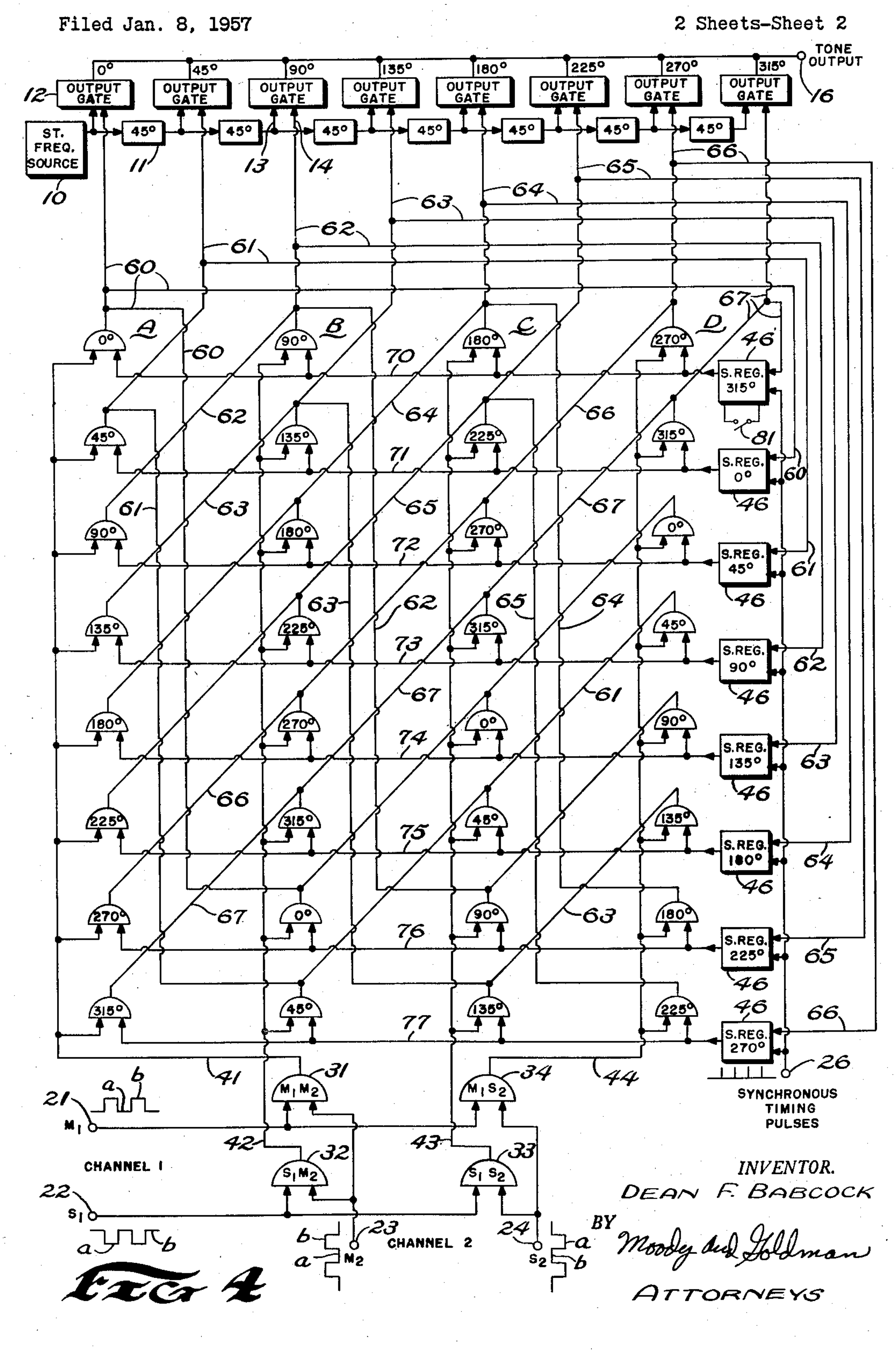

The decision matrix includes four groups A, B, C and D of "and" decision gates shown vertically in Figure 4. Each group has eight decision gates designated respectively by a notation in degrees from 0° through 315° in 45° increments. The decision gates of each group have one of their inputs connected in common to the output of one of the four intelligence-matrix outputs. Thus, lead 41 connects the output of intelligence-matrix gate 31 to group A, lead 42 connects the output of intelligence-matrix gate 32 to group B, lead 43 connects the output of intelligence-matrix gate 33 to group C, and lead 44 connects the output of intelligence-matrix gate 34 to group D.

Figure 3:
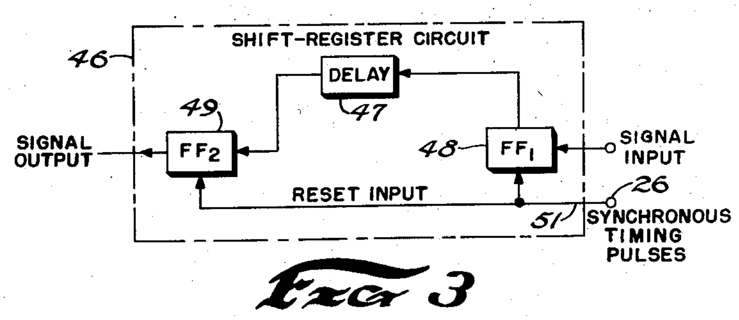
Figure 3 illustrates a shift-register circuit that may be used as a component in the invention; and, Figure 4 illustrates a form of the invention.

The decision matrix also includes eight shift-register circuits 46, and each may be conventional type illustrated in Figure 3. The function of each shift-register circuit is to receive an input at either voltage level *a* or *b* and to hold in storage until it is shifted to the output of the shift-register circuit. The shift-register circuit in Figure 3 includes a delay circuit 47 connecting the output of a first bistable circuit 48 to the input of a second bistable circuit 49. The input to first bistable circuit 48 receives the input of the shift-register circuit; and the circuit out put is provided from the second bistable circuit. The resetting inputs of bistable circuits 48 and 49 are connected in common to a lead 51 that connects to terminal 26, which receives the synchronous-timing pulses, as shown in Figure 4. A shifting of the information stored in first bistable circuit 48 to the output of second bistable circuit 49 occurs immediately after the reception of a timing pulse. Conventional flip-flop circuits can be used as bistable circuits 48 and 49.

The decision gates, output gates and shift register circuits are given angular designations in Figure 4; and those having a common angular designation have a connection in common. Thus, the four decision gates with a particular angular designation have their outputs connected in common with the control input of the output gate having the same angular designation and with the signal input of the shift-register circuit having the same angular designation. In this manner, leads 60 through 67 connect the respective decision gates, output gates, and shift-register circuits. For example, leads 65 connect the four decision gates, shift-register circuit, and output gate, having the angular designation 225°.

Although each of the decision-matrix groups have eight gates with designations 0° through 315°, they are staggered with respect to their connections to the outputs of the shift-register circuits. In Figure 4, respective horizontal rows of decision gates connect to the outputs of the shift-register circuits. Leads 70 through 77 provide these respective connections. One type of horizontal row includes decision gates 0°, 90°, 180°, 270°, which are even-integer multiples of 45°; and the alternate type of horizontal row includes decision gates 45°, 135°, 225° and 315°, which are odd-integer multiples of 45°. Note that odd-integer-multiple horizontal rows are interleaved with even-integer-multiple horizontal rows.

Before operating the invention, level *b* must be stored at the output of one of the shift-register circuits, while the other shift-register circuits are providing output levels *a*. This initial state can be provided by a switching transient obtained by turning on the power to the circuit. Switch 81 in Figure 4 is arbitrarily connected to the 315° shift-register circuit and is interlocked with the power-source switch (not shown). Thus, the closing of switch 81 causes level *b* to be stored in the 315° shift-register circuit, which is provided to lead 70; and each of the decision gates in the upper horizontal row receives level *b* as one input.

When dual-channel data is provided to input terminals 21 through 24, one of the intelligence-matrix outputs will be energized with level *b* voltage according to the particular combination of data inputs received. Hence, one of the leads 41 through 44 is energized to level *b*, which is provided as the other input to one of the decision gates in the upper horizontal row in Figure 4. This decision gate then closes an output gate to provide an appropriate output tone pulse.

For example, if mark data-pulses are simultaneously provided by both channels ($M_1M_2$), intelligence gate 31 and its lead 41 provide output *b* to one input to each decision gate in group A. Only the 0° decision gate in group A receives level *b* at both inputs and then provides output level *b* to close the 0° output gate for the duration of the $M_1M_2$ input-data pulses. Thus, an output tone pulse is provided for the duration of the $M_1M_2$ input-data pulses. This is illustrated as pulse 83 in Figure 2 which has a time duration, shown between lines 84 and 85, that is the duration of the simultaneous input-data pulses. Output tone pulse 83 has a phase represented by vector $(M_1M_2)_0$ in Figure 2.

When the 0° decision gate in group A provides output level *b*, this output is also provided by lead 60 to the input of the 0° shift-register circuit, where it is stored. No other shift-register circuit then receives level *b*, including the 315° shift-register circuit. Accordingly, the remaining shift-register circuits store level *a* at their inputs.

The next synchronous timing pulse, which occurs at the initiation of the next data inputs, is received by the shift-register circuits to move the information stored at their inputs to their output. Since only the 0° shift-register circuit then has level *b* stored at its input, it is the only one which can have level *b* shifted to its output where it energizes horizontal lead 71.

If it is assumed that both channels again provide mark data inputs, lead 41 again is energized with level *b*, and 45° decision gate in the second horizontal row receives a pair of level *b* inputs to provide an output that opens 45° output gate 12 to begin a new output tone pulse, shown as tone pulse 87 between duration lines 85 and 88 and is represented by vector $(M_1M_2)_1$ in Figure 2. Pulse 87 has a phase of 45° leading with respect to prior adjacent pulse 83, which is seen in Figure 2 by the comparison of vectors $(M_1M_2)_0$ and $(M_1M_2)_1$. Therefore, the phase between tone pulses 83 and 87 complies with the vector requirements illustrated in Figure 1 to designate a mark for both channels by the modulated tone-frequency output.

The level *b* output of the 45° decision gate in group A is provided by lead 61 to the signal input of the 45° shift-register circuit, where it is stored.

If it is assumed that the next simultaneous data-input pulses to terminals 21 through 24 are $S_1M_2$, intelligence gate 32 provides level *b* to lead 42; and simultaneously a timing pulse shifts the level *b* stored at the input of the 45° shift register circuit to its output to energize horizontal lead 72. Accordingly, the 180° decision gate in the third horizontal row is actuated to open the 180° output-gate, which then provides tone 89 illustrated in Figure 2 between duration lines 88 and 90, and causes the 180° shift-register circuit to store level *b* at its input. Thus, the phase of the tone output is changed from 45° to 180°, which is a phase difference of 135° required to signify vector $S_1M_2$ in Figure 1. In Figure 2, this is shown by the vector diagram having vector $(M_1M_2)_1$ as the reference vector (phase of preceding pulse) and vector $(S_1M_2)_1$ as the phase of new pulse 89.

If the next set of input-data pulses are $S_1S_2$, vertical lead 43 and horizontal lead 75 are energized with level *b* to activate the 45° decision gate in group C, which then opens the 45° output gate to provide tone pulse 91 in Figure 2 between duration lines 90 and 92. The phase shift between new pulse 91 and prior adjacent pulse 89 is 225° which is required between adjacent tone pulses to indicate $S_1S_2$ information, as illustrated in Figure 1. The infinite transient response between pulses shown in Figure 2 is for illustration purposes, but is not obtained in practice because of the narrow bandwidths generally provided. However, very good transient response is not necessary or desired for this type of communication system, which enables maximum detection of signal in the presence of large amounts of noise with a minimum bandwidth used for transmission.

It is, therefore, realized that the matrix system in Figure 4 is capable of providing all of the phase pulses required for a dual-channel transmission system.

Although this invention has been described with respect to a particular embodiment thereof, it is not to be so limited as changes and modifications may be made therein which are within the full intended scope of the invention as defined by the appended claims.

I claim:

1. A phase-pulse generator for encoding binary data, comprising a stable source of electrical oscillation, phase-shift means connected to said oscillation source to provide different output phases of said oscillation, a plurality of output gates having their signal inputs connected to the output phases of said phase-shift means, said output gates having their outputs connected in common to provide the output of said generator, said output gates being normally closed to prevent their signal inputs from being provided at their outputs, decision-matrix means for sequentially opening said gates to permit their respective input signals to pass to their outputs, a source of timing signals, shift-register means included with said decision-matrix means and being connected to said timing signal source, said shift-register means storing prior data settings of said decision-matrix means, intelligence-matrix means for resolving said binary data into a sequential signal, outputs of said intelligence-matrix means being connected to the input of said decision matrix to sequentially actuate said output-gates with phase correlation to said binary data 2. A phase-pulse generator as defined in claim 1, wherein tap points along said phase-shift means provide phases that vary with approximately 45° increments, said phase increments being included within the range from 0° through 315°, the signal inputs of said output gates being connected to said tap points.

3. A pulse-phase generator as defined in claim 2 in which said decision-matrix means is comprised of a plurality of groups of "and" gates, and a plurality of shift-register circuits, each "and" circuit in one of said groups having one input connected to a respective one of said intelligence-matrix means outputs, the outputs of said shift-register circuits respectively connected to the other input of the "and" circuits within each respective group, the signal inputs of said shift-register crcuits connected respectvely to the control inputs of said output gates, and a timing input synchronous with said data being connected in common to the resetting inputs of said shift-register circuits.

4. A phase-pulse generator as defined in claim 3 for receiving information from first and second binary channels, in which said intelligence-matrix means is comprised of four "and" gates, a first pair of input terminals respectively received inverted data from said first channel, a second pair of input terminals respectively receiving inverted data from said second channel, the first and fourth of said intelligence "and" gates having one input connected to one of said first pair of terminals, the second and third intelligence gates having one input connected to the other of the first pair of terminals, the first and second intelligence gates having their other inputs connected to one terminal of said second pair, and the third and fourth intelligence gates having their other inputs connected to the other terminal of said second pair.

5. A phase-pulse generator as defined in claim 3 in which each group in said decision-matrix means includes a number of decision "and" gates equal to the number of said output gates, with a given phase separation being provided between the signal input to the output gate controlled by a respective one of said decision "and" gates and the signal input of the shift-register circuit connected to one input of said respective "and" gate.

6. A phase-pulse generator as defined in claim 5 in which each shift register circuit has two memory stages with an intermediate delay.

7. A phase-pulse generator for modulating a single frequency with binary information from a pair of dual channels, comprising phase-shifting means connected to said frequency, said phase-shifting means having at least eight terminals, with the phase at said eight terminals being related by increments of approximately 45° from an arbitrarily designated 0° through 315°, a plurality of output gates having their signal inputs respectively connected to said eight terminals, the output of said generator being connected in common to the outputs of said output gates; a decision matrix, comprising four groups of decision gates, each group comprising eight "and" gates, with the "and" gates in each group having their outputs connected respectively to the control inputs of said output gates, eight shift-register circuits, having their signal inputs respectively connected to the control inputs of said output gates, a timing terminal connectable to a source of timing pulses synchronous with the pulses of said dual channels, each of said shift-register circuits being two stage and having its resetting input connected to said timing terminal, the output of each shift-register circuit being connected to one input of a different decision "and" gate in each of said groups; a given phase separation being provided between the signal input to the output gate controlled by a respective one of said decision "and" gates and the signal input of the shift-register circuit connected to one input of said respective "and" gate; an intelligence matrix comprising four "and" gates, the outputs of said intelligence "and" gates respectively connected to said decision matrix groups to provide the other input to the "and" circuits in said respective groups, two pair of data input terminals, with each pair receiving inverted data from one of said dual channels, and the inputs to said intelligence "and" gates being connected in permuted combinations to said two pair of data-input terminals.

8. A phase-pulse generator for modulating a single frequency with simultaneous information from a pair of binary-data channels, comprising a phase-shift circuit having at least eight points providing relative phase shifts of 0°, 45°, 90°, 135°, 180°, 225°, 270° and 315° of said frequency; eight output gates having their signal inputs respectively connected to said phase-shift circuit points, an output terminal connected in common to the outputs of said output gates, said output gates being normally closed to inhibit its received phase; a decision matrix means for sequentially opening said output gates, said decision matrix means comprising eight shift-register circuits, and four groups of "and" circuits, each group including eight "and" circuits, the control input of each output gate being connected in common to the signal input of a different one of said shift-register circuits and the output of a different one of said "and" gates in each of said groups, a source of timing pulses synchronous with said data pulses connected to the resetting input of each of said shift-register circuits, each of said shift-register circuits having two storage stages, the output of each of said shift-register circuits being connected to one input of a different one of the "and" circuits in each of said groups; an intelligence matrix comprising four "and" circuits, the outputs of said intelligence "and" circuits being connected respectively to a different one of said groups, with the remaining inputs of the "and" circuits in each group being connected to the outputs of a respective one of said intelligence "and" circuits, a first pair of input terminals respectively receiving inverted binary data from one of said channels, a second pair of input terminals respectively receiving inverted binary data from a second of said channels, the first and fourth intelligence gates having one input connected to one of said first pair of input terminals, the second and third intelligence gates having one input connected to the other of said second pair of input terminals, the first and second intelligence gates having their other inputs connected to one of said second pair of input terminals, and the third and fourth intelligence gates having their other input connected to the other of said second pair of input terminals.

References Cited in the file of this patent

UNITED STATES PATENTS

| | | |
|---|---|---|
| 1,813,929 | Hough | July 14, 1931 |
| 2,153,178 | Fitch | Apr. 4, 1939 |
| 2,522,368 | Guanella | Sept. 12, 1950 |